(12) United States Patent
Butler

(10) Patent No.: US 6,401,961 B1
(45) Date of Patent: Jun. 11, 2002

(54) FUEL TANK WITH INTEGRATED HEAT SHIELD

(75) Inventor: Richard Martin Butler, Canton, MI (US)

(73) Assignee: Rieter Automotive (International) AG, Zollikon (CH)

( * ) Notice: Subject to any disclaimer, the term of this patent is extended or adjusted under 35 U.S.C. 154(b) by 0 days.

(21) Appl. No.: 09/623,264

(22) PCT Filed: Mar. 2, 1999

(86) PCT No.: PCT/CH99/00096

§ 371 (c)(1), (2), (4) Date: Aug. 29, 2000

(87) PCT Pub. No.: WO99/44851

PCT Pub. Date: Sep. 10, 1999

Related U.S. Application Data

(60) Provisional application No. 60/076,834, filed on Mar. 4, 1998.

(51) Int. Cl.$^7$ ............................................. B65D 90/02
(52) U.S. Cl. ..................... 220/562; 220/560.01
(58) Field of Search ................ 220/560.01, 567.2, 220/562, 563, 564, 88.1

(56) References Cited

U.S. PATENT DOCUMENTS

| | | | |
|---|---|---|---|
| 4,895,268 A | * | 1/1990 | Hyde |
| 4,909,530 A | * | 3/1990 | Tsukada et al. |
| 4,930,811 A | * | 6/1990 | Tsukada et al. |
| 5,020,687 A | * | 6/1991 | Seizert |
| 5,067,575 A | * | 11/1991 | Hyde et al. |
| 5,129,544 A | * | 7/1992 | Jacobson et al. |
| 5,188,981 A | * | 2/1993 | Stiles et al. |
| 5,193,262 A | * | 3/1993 | Hyde et al. |
| 5,308,571 A | * | 5/1994 | Stiles et al. |
| 5,547,096 A | * | 8/1996 | Kleyn |
| 5,567,296 A | * | 10/1996 | Luch |
| 5,656,353 A | * | 8/1997 | Butler |
| 5,674,603 A | * | 10/1997 | Stiles et al. |

* cited by examiner

Primary Examiner—Stephen Castellano
(74) Attorney, Agent, or Firm—Nath & Associates PLLC; Gary M. Nath; Marvin C. Berkowitz

(57) ABSTRACT

The invention relates to a blow molded fuel tank having a heat shield which is fixedly joined to the fuel container. The positive fit between the heat shield and fuel container is achieved by integrating by molding claw-like protrusions of the heat shield.

8 Claims, 3 Drawing Sheets

FUEL TANK WITH INTEGRATED HEAT SHIELD

This application claims benefit of Provisional Application Ser. No. 60/076,834filed Mar. 24, 1998.

The invention at hand relates to blow-molded fuel tanks for vehicles in general, and fuel tanks with a heat shield in particular. The invention at hand also relates to a blow-molding method for producing a fuel tank with an integrated heat shield.

Today, fuel tanks for motor vehicles usually are produced by blow-molding using low-pressure polyethylene, i.e., high-density polyethylene (HDPE). The use of this type of plastic material results in long-lasting and solid fuel tanks which are also corrosion-resistant and can be produced simply and at low cost even while adhering to very exact specifications. However, such fuel tanks manufactured from this material have the disadvantage that they have a relatively low melting point. The melting temperature of this material is, for example, so low that the heat of the exhaust pipe or exhaust system of the motor vehicle could easily burn a hole into the tank or have another disadvantageous effect on it.

It is therefore necessary that a heat shield be installed between the fuel tank and the exhaust system for a fuel tank made from this material and located near the exhaust system or exhaust pipes. The state of the art discloses numerous methods of arranging a heat shield in a suitable position or a suitable place in order to protect fuel tanks from the heat of exhaust systems. For example, the installation of a heat shield near the vehicle bottom without direct contact to a fuel tank as well as the attachment of a heat shield to the tank has been described. Heat shields of this type are typically pressed parts of steel, SMC molding masses or duroplasts or heat-resistant compounds. However, such heat shields used to protect fuel tanks require longer production times, additional setup work and additional material or parts, along with the associated cost increases. In practice, it was also found that such heat shields may detach during the life of the vehicle because of corrosion, the effects of lose road surface, such as asphalt or gravel, and impacts because of poor road conditions or rough road surfaces. Examples of such heat shields as protection for a vehicle motor are described in U.S. Pat. No. 4,930,811 and U.S. Pat. No. 4,909,530 as well as U.S. Pat. No. 5,656,353.

An example of a heat shield attached directly to a fuel tank is disclosed in U.S. Pat. No. 5,193,262. Another example of direct attachment of a heat shield to a fuel tank is described in the three patents U.S. Pat. No. 5,188,981, U.S. Pat. No. 5,308,571, and U.S. Pat. No. 5,674,603, in which a heat shield is attached during the molding process to the outside of a tank and is integrated with it. Another example of an integrated heat shield is disclosed in U.S. Pat. No. 5,129,544, in which a very thin metal foil, for example of aluminum, is joined by heat and pressure with addition of an adhesion promoter between an outer plastic layer and an inner plastic layer.

The state of the art describes two kinds or types of heat shields that may be joined together in a laminate and may be integrated with the tank. The person skilled in the art knows, for example, the reflective type in which a reflecting metal, such as aluminum, is used, and an insulting type that uses, for example, a polymer foam or a plastic. In some examples of the state of the art, for example in the previously mentioned three U.S. patents, U.S. Pat. No. 5,188,981, U.S. Pat. No. 5,308,571, and U.S. Pat. No. 5,674,603, the laminate consists of a metal foil with a thickness of about 1 to 2 mils (1 mil=25.4 $\mu$m), and a layer of a non-porous, insulating material and a layer of a porous, insulating material. These laminate layers are chemically interconnected. In U.S. Pat. No. 5,567,296 and U.S. Pat. No. 5,547,096, the outer, reflective layer is an electrochemically applied metal.

Although a fuel tank with an integrated heat shield, such as, for example, in the mentioned U.S. Pat. No. 5,188,981, U.S. Pat. No. 5,308,571, and U.S. Pat. No. 5,674,603, appears to be the best solution, it was found that in practice the laminate layers of the heat shield of such fuel tanks have a tendency to peel off or break off or completely detach over the course of time because of wear due to heat, chemicals, and/or vibration. In particular, it was found that in practice it is difficult to bond the outer metal foil to the inner, insulating layers.

In the exemplary embodiments of the state of the art, in which an electrochemically applied metal is used, it is also difficult to obtain a layer with a sufficient thickness at an economical price. Practice has also shown that layers produced in such a way tend toward losses due to abrasion.

As a result, there is a need for an economical, easily producible, easily moldable, and long-lasting or wear-resistant fuel tank that can be located close to the exhaust system of the motor vehicle without being damaged.

It is a further objective of the invention at hand to create a fuel tank with an integrated heat shield. In particular, a fuel tank should be created whose integrated heat shield does not peel off, break off, or completely detach from the tank, but whose heat shield is integrated permanently in the tank and is bound in a fixed and definitive manner to the tank.

It is yet another objective of the invention at hand to create a process that can be used to manufacture fuel tanks with integrated heat shields economically, simply, and in a short time. In particular, a process should be created that makes it possible to achieve a permanent and extremely effective integrative bond of the heat shield to the fuel tank in a quick and cost effective manner.

The invention at hand provides a way of eliminating the mentioned disadvantages of the state of the art by utilizing the advantages of blow-molding in manufacturing the fuel tanks while simultaneously providing a versatile, easily positioned, easily producible heat shield that can be integrated permanently or in a wear-resistant manner. The invention at hand also uses the advantages associated with the use of a relatively thick, metallic heat shield as an integrating component of a blow-molded fuel tank. The invention at hand furthermore utilizes the advantages associated with a metallic heat shield cast directly into the wall of the fuel tank at any desired position.

In a preferred method for producing a fuel tank according to the invention at hand, a relatively thick, metal sheet is perforated in such a way that a plurality of protrusions/break-through in the form of claws or barbs is created, and this metal sheet is reshaped into a desired configuration or shape.

The reshaped, metal sheet and a parison are then placed in an opened mold that is suitable for blow-molding. After the mold is closed, the mold chamber is heated and a pressurized fluid is introduced into the parison in such a way that the latter expands and comes into contact with the inside walls of the mold, and the placed, perforated, and shaped metal sheet is pressed into the wall of the parison. The mold is then opened, and the finished fuel tank is removed from the mold along with the embedded heat shield. A fuel tank according to the invention at hand comprises a perforated, shaped, metal sheet whose protrusions are cast directly into the wall of the tank, and which metal sheet is located close to a heat source, such as, for example, components of the exhaust system, when the tank is installed.

The invention at hand has additional advantages: a heat shield is bonded permanently and firmly to the outside of the tank wall. This also means that neither additional assembly nor additional or later work steps are required. The heat shield also can be positioned accurately and precisely. It is advantageous that no additional time is required when the mold suitable for blow-molding is used, but only the so-called "in-mold" time required when producing an adequate fuel tank without integrated heat shield. Another advantage is that the preshaped heat shield can be configured so that it adapts itself to any contour during the blow-molding of the three-dimensional tank body.

According to an exemplary embodiment of the invention, a blow-molded fuel tank for a motor vehicle that comprises a container and a heat shield is created. The container has at least one wall and is made from a thermoforming, polymer plastic that is suitable for blow-molding. The heat shield is provided on at least one of the walls and integrated therein. The heat shield is constructed as a three-dimensional body with a first side and a second side, and has a plurality of perforations. The perforation density is usually about 50 perforations per 10 cm$^2$. These perforations are all made from the same side, so that all claws are formed on the side of the heat shield. In the finished fuel tank, a peg consisting of the same plastic as the container extends through each perforation. The claw is embedded into the wall of the container in such a way that the heat shield is integrated with the container.

In a preferred embodiment of the invention at hand, a method for producing a fuel tank with a container and a heat shield is created. The container is hereby defined by at least one wall, where said wall has an inside and an outside. The heat shield is embedded into the outside of the wall. In the first step of the process, a metal sheet with a thickness between 0.1 mm and 0.3 mm is provided, and a plurality of perforations are shaped into the metal sheet from the same side in such a way that protrusion-like claws are formed on the other side of the metal sheet. The metal sheet is constructed as a three-dimensional shape and is then arranged in a chamber of a blow mold with inside walls, where said inside walls define the outside shape of a fuel tank to be blow-molded. The metal sheet is arranged in such a way that its claws extend into the chamber of the blow mold. A parison with an inner chamber is then arranged inside the chamber of the blow mold. A pressurized fluid is introduced into the inner chamber of the parison. The fluid is under a sufficient pressure to bring the parison into contact with the chamber of the blow mold and into contact with the metal sheet and its claws, in such a way that the plastic places itself around the claws of the perforations, and in particular projects through the protrusions. In this manner, the metal sheet is interactively fastened to the plastic of the tank body. The expanded or enlarged parison is then hardened, and the produced, blow-molded fuel tank is removed from the chamber of the blow mold with an integrated, metal heat shield.

The blow-molded fuel tanks naturally could comprise several layers.

The following text is intended to explain the invention in more detail in reference to the figures, whereby:

In the figures, identical parts have been identified with the same reference numbers.

Figure 1:
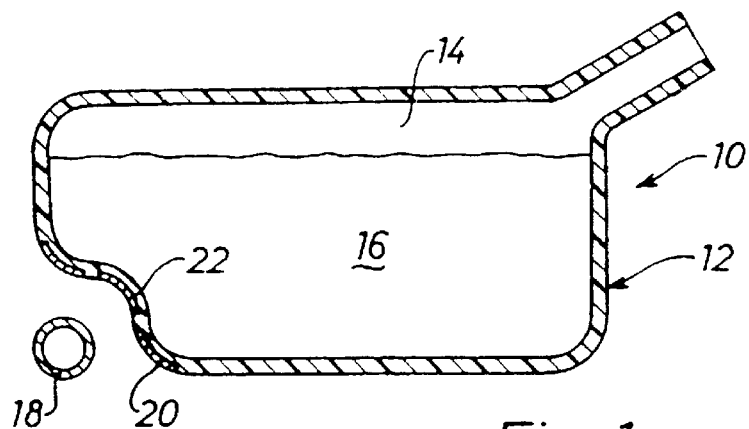
FIG. 1 shows a view of a cross-section of a fuel tank according to the invention, which is located close to an exhaust pipe of a vehicle exhaust system.
Figure 3:
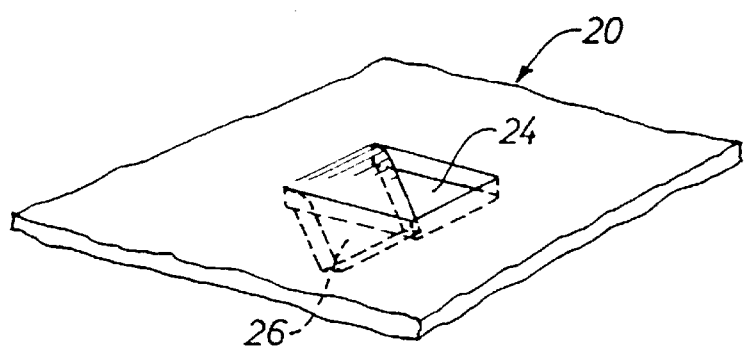
FIG. 3 shows an enlarged, schematic, and perspective view of a rectangular perforation, whereby only one of the four claws produced by the perforation process is shown (additional details and parts are not shown for reasons of clarity)
Figure 2:
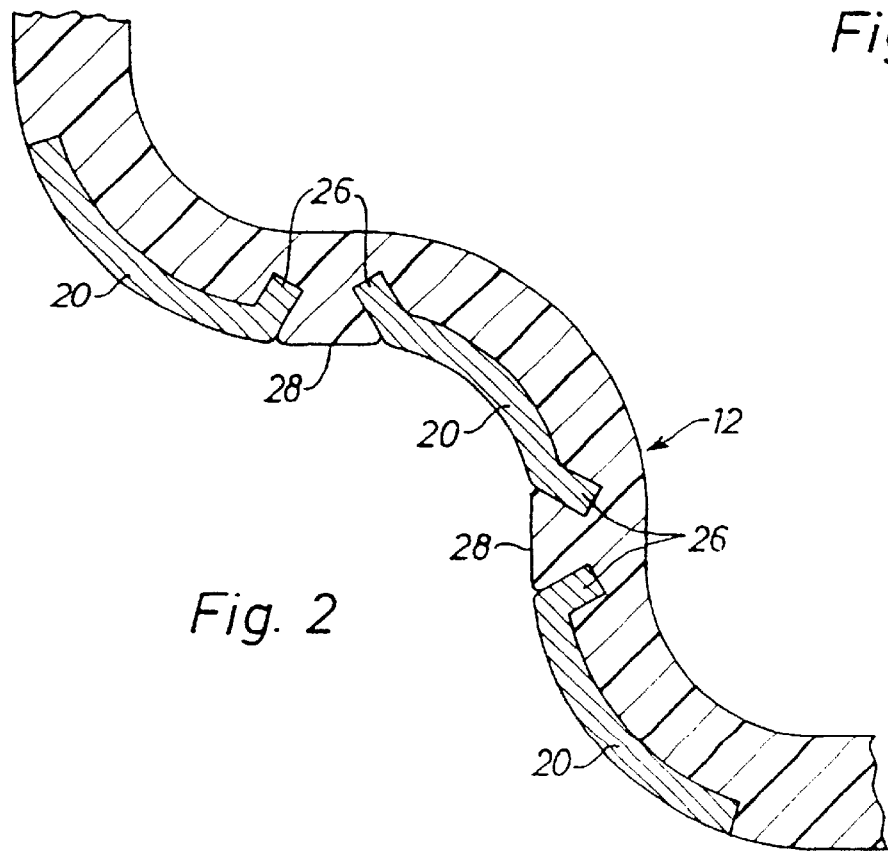
FIG. 2 shows an enlarged view of a cross-section of a perforated, metal heat shield according to the invention, which is embedded in the wall of a blow-molded fuel tank (the perforations in the heat shield are larger and less in number than would be shown in a true-to-scale drawing)
Figure 4:
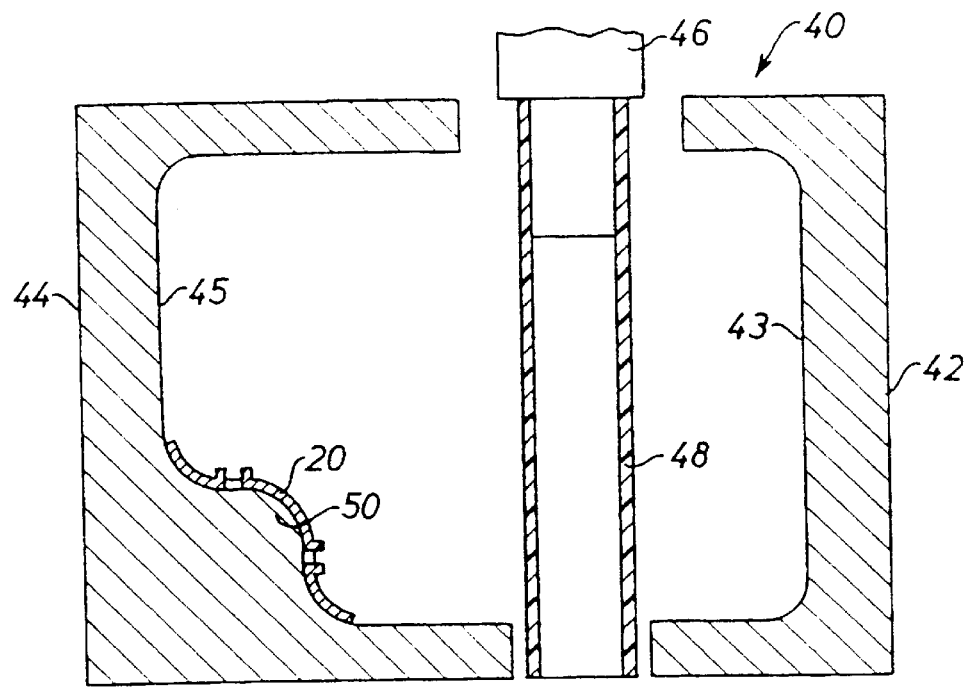
FIG. 4 shows a schematic view of a cross-section of an open mold suitable for blow-molding, with an inserted parison and a perforated heat shield according to the invention, which is located at a partial section of the mold.

The following text references FIGS. 1 to 3. FIG. 1 shows a cross-section of a blow-molded fuel tank 10 with a wall 12 and an inner chamber 14. The shape of the wall 12 is defined by the mold used for the blow-molding process. The tank 10 is made from a standard thermoforming plastic, for example polypropylene or polyethylene or one of their derivatives. FIG. 1 shows that the tank 10 is designed to hold a liquid fuel 16, for example gasoline.

The tank wall 12 is preferably a laminate made from a multilayer insulator and a heat shield (not shown). As shown in FIG. 1, an exhaust pipe 18 that is part of the exhaust system of a motor vehicle is located on the left side of the tank 10. Because of the high temperatures of the exhaust gases, the exhaust pipe 18 becomes very hot, so that plastic of the tank 10 could melt or degrade.

In order to protect against the heat generated by the exhaust system, heat shield 20 is attached to the outside of the wall 12. As shown in FIG. 1, the wall 12 has an indentation 22 in the area of the exhaust pipe 18 so that the exhaust pipe of the motor vehicle can be suitable installed and placed. The heat shield 20 is designed and shaped in such a way that it adapts to the indentation 22.

In a preferred embodiment, the heat shield 20 comprises a strong heat-reflecting, stable material, such as, for example, metal. Suitable metals comprise aluminum, stainless steel, and coated and polished, low-carbon steel. The heat shield 20 preferably consists of a thin sheet of the metal with a thickness of about 0.1 mm to 0.3 mm and has a plurality of angular, particular rectangular perforations 24 (see FIG. 3). The perforations 24 are made with standard perforating rollers (not shown) which are equipped with a plurality of hole punchers or punching dies with a tip and a chisel-like, angular cross-section beginning just above the tip. As a result of the hole punchers penetrating into the metal sheet, a plurality of claws 26 (in general two) are formed on only one side of the heat shield 20, as is shown in FIG. 2. Preferred perforations have a length of about 2 mm and a width of about 1 mm and are applied with a density of about 50 perforations per 10 cm$^2$. As a result, the length of the claws 26 then is about 1 mm. During the process according to the invention, the material of the tank wall penetrates into the protrusions, forming pegs 28. The combination of, on the one hand, the very good penetration capability of the plastic material which is very soft during the blow-molding, and on the hand, the design of the claws 26 results in a very good mechanical attachment of the heat shield 20 at the tank 10. FIG. 2 shows that the design or shape of the claws 26 according to the invention ensures that the pegs 28, and therefore the tank wall 12, are able to ideally reach around the claws 26 and in this way are able to create a positive fit connection between the heat shield and the wall.

Figure 5:
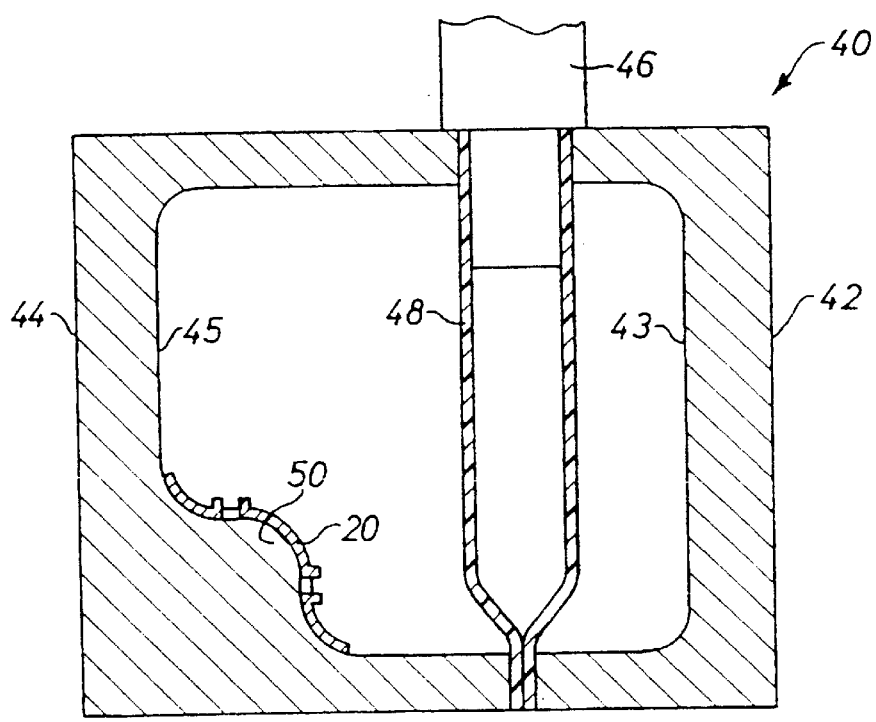
FIG. 5 shows a schematic view of a cross-section of the mold suitable for blow-molding of FIG. 4 in its closed position, before a pressurized fluid is introduced into the parison.

FIGS. 4 to 7 shall be referenced to describe the method for producing the fuel tank 10. At the outset, it should be noted that for reasons of clarity the protrusions in the heat shield are shown larger and in greater numbers than would be shown in a true-to-scale drawing. A mold 40 is shown in its open position in FIG. 4 and consists of a first semi-mold 42 with a first inner wall 43 and a second semi-mold 44 with a second inner wall 45. The inside walls 43 and 45 form a chamber when the form halves 42 and 44 are closed. FIG. 5 shows that an extruder 46 is arranged at the marginal areas of the mold halves 42 and 44 and in extension of the parting plane of mold 40, where said extruder has extruded a hollow parison 48. A curvature 50 in the second mold half 44 creates the indentation 22 in the finished tank 10. After the metallic heat shield 20 has been perforated and molded partially or even completely into its final shape, the heat shield 20 is arranged on the curvature 50. The heat shield 20 can be held in the desired position, for example, by using a vacuum with the help of drilled holes in the curvature 50, or by an adhesive which loses its adhesive effect as a result of heat (not shown), or by a metal band (not shown), or by any other common means, whose adhesive effect can easily be reversed.

Figure 6:
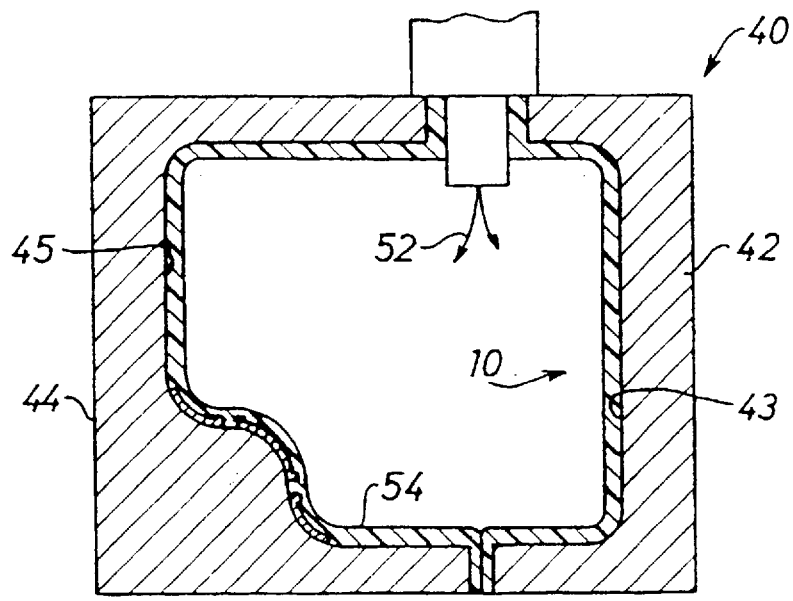
FIG. 6 shows a schematic view of a cross-section of the mold suitable for blow-molding of FIG. 5, after the pressurized fluid has been introduced.
Figure 7:
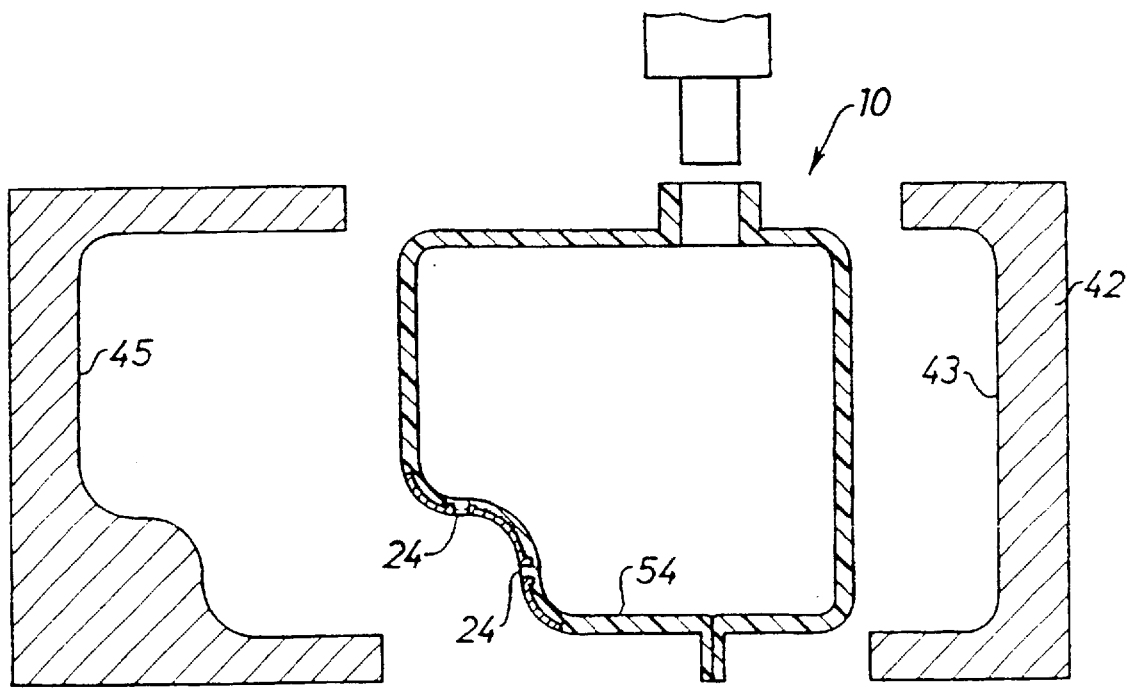
FIG. 7 shows a schematic view of the cross-section of the open mold suitable for blow-molding of FIG. 6 after the process for blow-molding has been completed, and a finished fuel tank with embedded heat shield has been produced.

FIG. 5 shows the mold 40 in its closed state. By closing the mold, the bottom part or floor of the parison 48 has been pressed together or constricted by the bottom edges of mold halves 42 and 44 and therefore have been tightly closed. In FIG. 6 a pressurized fluid 52 is fed in the manner well known to a person skilled in the art into the parison 48. The fluid 52 is usually a heated gas. If a compressed gas is introduced into the inside chamber of the parison 48, the parison is enlarged. It is pressed against the inside walls 43 and 45 of the mold halves 42 and 44 and reaches the side of the heat shield 20 that has been equipped with the claw-like protrusions 26. The material of the parison 48 expands through the individual protrusions, so that pegs 28 form in each of the protrusions. As a result of the heat and pressure, the plastic of the parison solidifies, forming a rigid tank 10 with an outside wall 54 whose shape is determined by the shape of the inside walls 43 and 45 of mold halves 42 and 44. In this way, the inward projecting claws 26 are surrounded by the plastic and are integrated with a positive fit into the tank wall 54.

A fuel tank and a blow-molding method for producing a fuel tank were described in accordance with a preferred exemplary embodiment of the invention. The fuel tank has an integrated heat shield in order to protect the tank from heat or heat sources located near it, for example from an exhaust system of a motor vehicle. The heat shield comprises a metal layer with a plurality of protrusions, whereby each of these protrusions is provided with a plurality of claws as a result of the perforation process. All of these protrusions are located on the same side of the heat shield. The heat shield is simultaneously with the blow-molding of the tank integrated into the plastic wall of the fuel tank in such a way that it is completely integrated into the tank. In addition to the lower costs, increased reliability, and shorter production times, the invention at hand has the advantage of creating fuel tanks with an integrated heat shield which may have very different and optionally shaped contours. This makes it possible to modify the fuel tank according to the invention in a simple manner so that it can be used in cars and trucks, but also for water vehicles or motor bikes.

Although this document describes preferred exemplary embodiments of the invention, it is obvious to persons skilled in the art of the invention that changes and modifications of the described exemplary embodiments can be performed without deviating from the nature and purpose of the invention. Naturally, no additional inventive activity is necessary for the person skilled in the art to use known multilayer systems with insulating and reflective layers as the heat shield of the invention. The modification of such multilayer systems along with the creation of the claws according to the invention can be achieved with known methods.

What is claimed is:

1. Blow-molded fuel tank for a motor vehicle, whereby the fuel tank (10) comprises a container and a heat shield (20), whereby the container is provided with a wall (12) that is made from a thermoforming, polymer plastic suitable for blow-molding, and the heat shield (20) is provided at the outside of this wall (12), whereby said heat shield (20) has been preshaped in such a way that it is provided with a plurality of perforations (24), said perforations (24) having on the side facing the container wall (12) claw-like protrusions (26) through which a peg (28) of the material forming the container wall (12) extends, said peg (28) reaching around these claw-like protrusions (26), and whereby these claw-like protrusions are embedded in the material in such a way that a positive fit connection is created between the heat shield (20) and the container.

2. Blow-molded fuel tank as claimed in claim 1, characterized in that the heat shield (20) is provided with about 50 perforations over an area of 10 cm$^2$.

3. Blow-molded fuel tank as claimed in claims 1, characterized in that the perforations (24) are provided with an angular, in particular a rectangular, shape.

4. Blow-molded fuel tank as claimed in claim 1, characterized in that the perforations (24) have a length of about 1 mm to 3 mm and a width of about 0.5 mm to 1.5 mm.

5. Blow-molded fuel tank as claimed in claim 1, characterized in that the claw-like protrusions (26) have a length of about 0.5 mm to 1.5 mm.

6. Blow-molded fuel tank as claimed in claim 1, characterized in that the heat shield (20) comprises at least one metal sheet of aluminum, stainless steel, or low-carbon steel.

7. Blow-molded fuel tank as claimed in claim 6, characterized in that the metal sheet has a thickness of about 0.1 mm to 0.3 mm.

8. Blow-molded fuel tank as claimed in claim 1, characterized in that it has a multi-layer construction.

* * * * *